United States Patent [19]
Snyder

[11] Patent Number: 5,988,327
[45] Date of Patent: Nov. 23, 1999

[54] INDUSTRIAL DISK BRAKE FOR CRANES

[76] Inventor: Robert Snyder, 8212 E. Liberty St., Hubbard, Ohio 44425

[21] Appl. No.: 08/958,964

[22] Filed: Oct. 28, 1997

[51] Int. Cl.⁶ .................................................... B60T 13/04
[52] U.S. Cl. ............................................................. 188/171
[58] Field of Search ..................................... 188/171, 173, 188/161; 192/89.21

[56] References Cited

U.S. PATENT DOCUMENTS

| 3,087,104 | 4/1963 | Berman | 318/367 |
| 4,142,610 | 3/1979 | Alexander | 188/71.9 |

FOREIGN PATENT DOCUMENTS 517182  10/1955  Canada .

*Primary Examiner*—Robert J. Oberleitner
*Assistant Examiner*—Hargobind S. Sawhney
*Attorney, Agent, or Firm*—Harpman & Harpman

[57] ABSTRACT

A disk brake for industrial use, especially overhead cranes and the like includes; electromagnetic coils that upon activation are arranged for disengaging a spring-urged armature plate from contact with a multiple friction thrust disk assembly. The friction disks being in direct drive contact with the drive shaft of the overhead crane. The thrust disk between the friction disk are engaged after deactivation of the electromagnetic coils that are electrically connected in series from a parallel DC circuit driven by a tuned AC transformer and rectifier system.

9 Claims, 5 Drawing Sheets

INDUSTRIAL DISK BRAKE FOR CRANES

BACKGROUND OF THE INVENTION

1. Technical Field

This device relates to improvements in electromagnetic coil driven industrial disk brakes. More particularly, the invention relates to a brake for use with an overhead crane wherein a spring-urged braking armature is selectively pulled away from a multiple disk braking assembly by activation of electromagnetic coils.

2. Description of Prior Art

Prior art devices of this type have used a variety of different brake configurations such as direct current magnetic shoe brakes seen in U.S. Pat. No. 3,322,242 where a pair of opposing brake shoes are pivotally engaged against a drum. These brakes have maintenance problems requiring frequent adjustment and thermal limitations during service.

Caliper disk brakes provide a pair of oppositely disposed braking pads for engaging on either side of a brake disk connected to a crane hoist drive shaft as seen in U.S. Pat. No. 5,582,277.

U.S. Pat. No. 4,067,420 is directed to a disk brake for industrial use having a pair of brake blocks on either side of a brake disk with an electromagnetic release.

U.S. Pat. No. 3,520,386 is also directed to an industrial disk brake having a braking disk with two opposing armatures with attached brake shoes that are urged together against the braking disk by the action of the stack of bellevelle washers bringing the braking assembly liners for engagement with the braking disks. Deactivation of the electromagnetic coil disengages the hereinbefore described braking pads.

U.S. Pat. No. 5,253,738 discloses a safety disk brake for lifts having brake shoes and linings that are spring-urged against a brake disk. An electromagnetic counter force is exerted to lift the brake shoes from the disk releasing same.

Prior art braking assemblies upon which the improvement of the invention is based have a multiple friction plate and thrust braking assembly with a pull brake assembly and a registering armature plate assembly, for example, manufactured by Robin-Meyers, Inc.

Such DC brake assemblies require high voltage initially which has to be switched to low voltage to prevent coils from over heating. This typically results in brake creep which is undesirable.

Applicant's improvement of tuned DC circuit driven by a tuned AC transformer allows the flux in the circuit to decay very rapidly thus closing the brake instantly thus stopping the load instantly which is not possible in prior art brakes of this type.

SUMMARY OF THE INVENTION

It is the primary object of the present invention to provide an improved industrial crane brake that provides a simplified less expensive braking device by using the advantages of AC current type electromagnetic coils driven by DC current to overcome the typical shortcomings of prior art brakes. By using a tuned power source, multiple electromagnetic coils can be energized releasing a spring-urged friction plate in a multiple friction and thrust disk assembly.

DESCRIPTION OF THE PREFERRED EMBODIMENT

Figure 4:
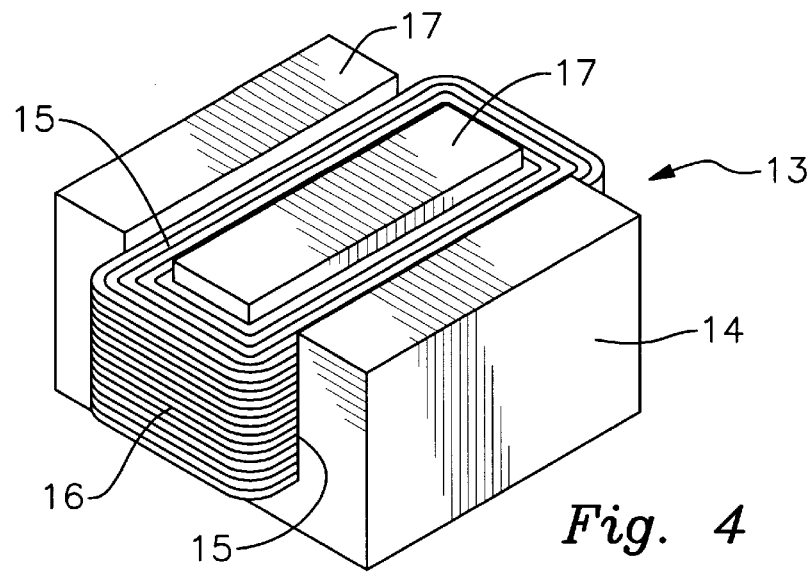
FIG. 4 is a perspective view of an electromagnetic coil of the invention.
Figure 5:
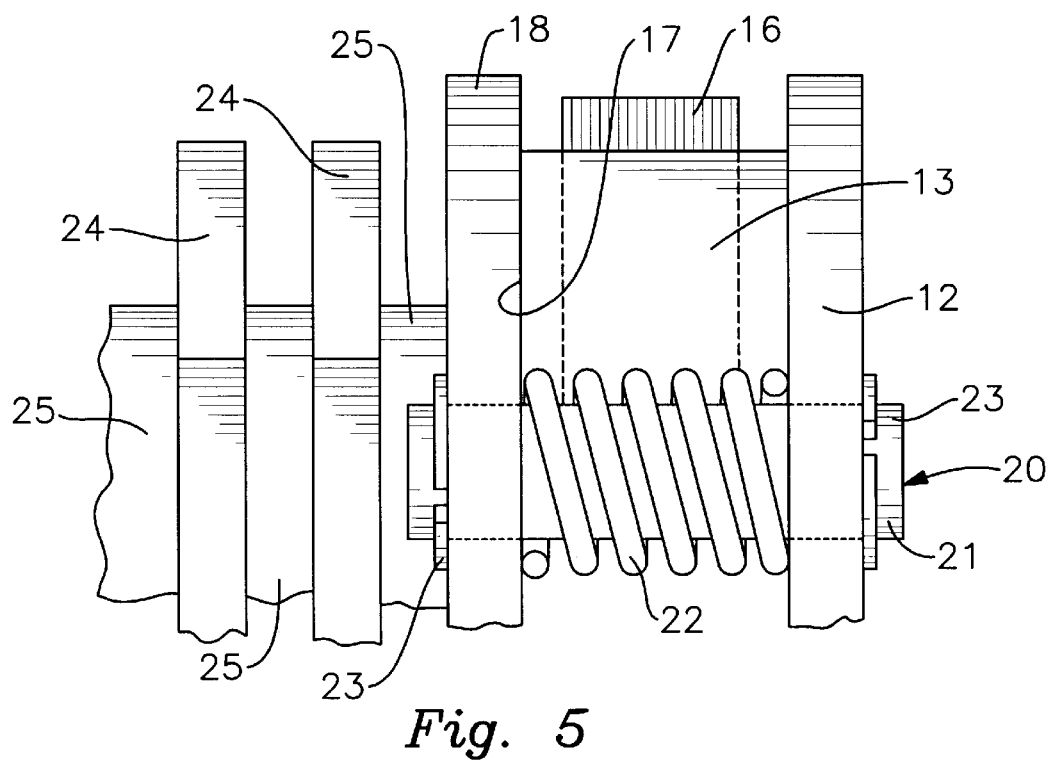
FIG. 5 is an enlarged partial side elevational view of the coil portion in energized state.

Referring to FIGS. 1–6 of the drawings, a crane brake 10 of the invention can be seen having a coil plate assembly 11 including a circular mounting plate 12 with a plurality of electromagnetic coils 13 positioned thereon. Each of the electromagnetic coils 13 are formed of a metal core 14 having a pair of parallel slots 15 therein as best seen in FIG. 4 of the drawings. A spiral wire turned coil 16 is positioned within the respective slots 15 slightly below plate engagement surfaces 17 of the metal core 14 as will be understood by those skilled in the art.

The electromagnetic coils 13 are circumferentially spaced on the mounting plate 12 and are electrically connected to one another and to a source of power through a control circuit C illustrated in FIG. 6 of the drawings as will be described in greater detail hereinafter. An apertured mounting plate 18 is movably positioned and aligned on a plurality of assembly rods 19 in transverse alignment with the mounting plate 12. A plurality of spring tension assemblies 20 extend between the respective mounting and braking plates 12 and 18. Each of the spring tension assemblies 20 include a spring receiving sleeve 21 extending through aligned apertures 21A in the mounting and braking plates 12 and 18 with a tension spring 22 positioned on the sleeve 21 between the mounting and braking plates 12 and 18 with retaining clips 23 in registering grooves adjacent the respective ends of the sleeves 21 securing same in position so that the springs 22 are normally urging the mounting and braking plates 12 and 18 apart as will be well understood by those skilled in the art.

Figure 6:
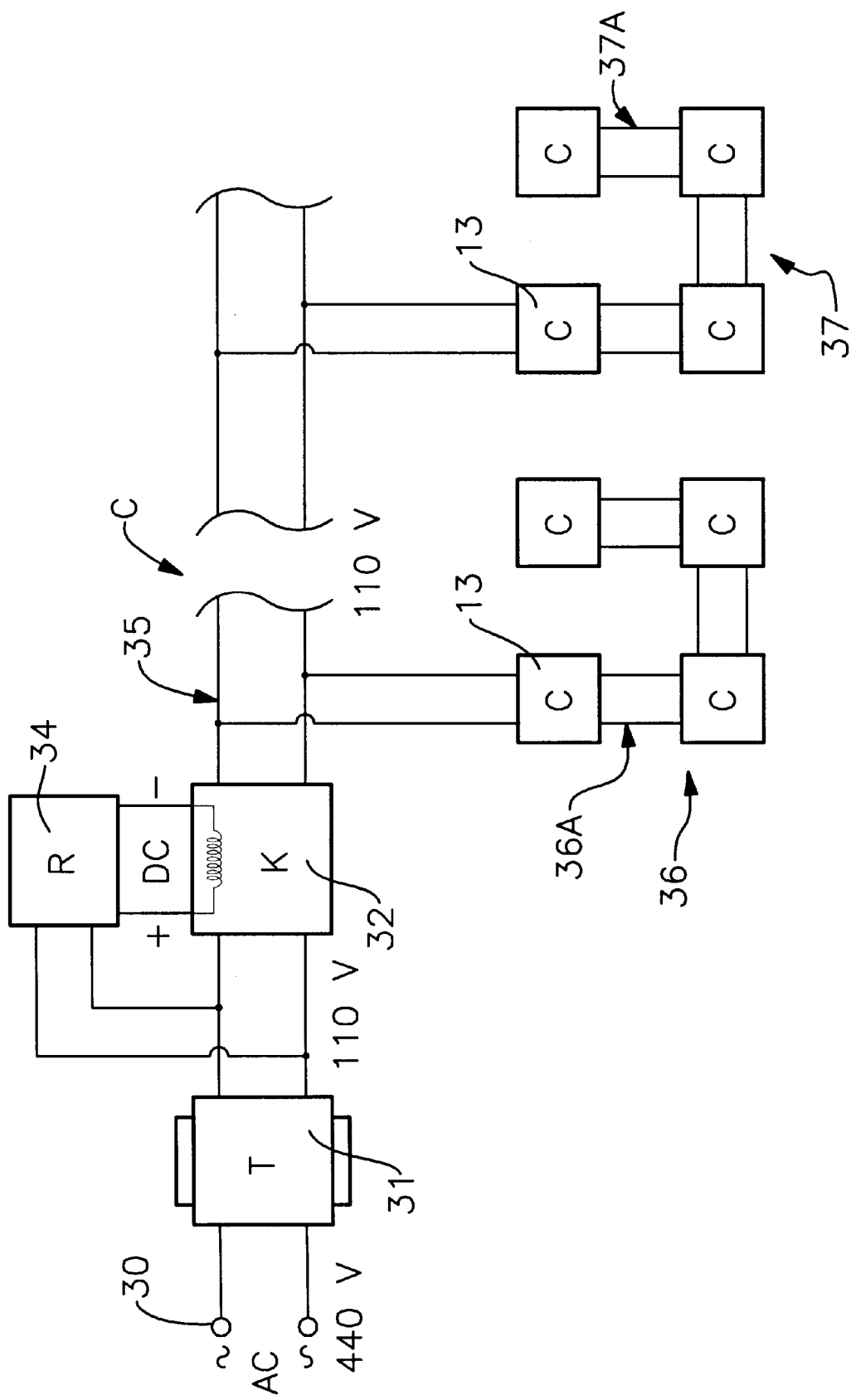
FIG. 6 is an illustrative flow diagram of the electrical circuit of the invention.

A series of thrust disks 24 are positioned on the rods 19 through aligned apertures 24A therein with a series of movable friction disks 25 positioned alternately therebetween as best seen in FIG. 6 of the drawings. Each of the friction disks 25 have a centrally positioned aperture therein the surface of which has a plurality of gear teeth 26 thereabout that are registerably engaged on a geared brake hub 27 extending through their centrally positioned apertures.

The brake hub 27 has a central bore at 27A which is keyed to a crane drive shaft 28 extending from the crane, not shown.

Figure 1:
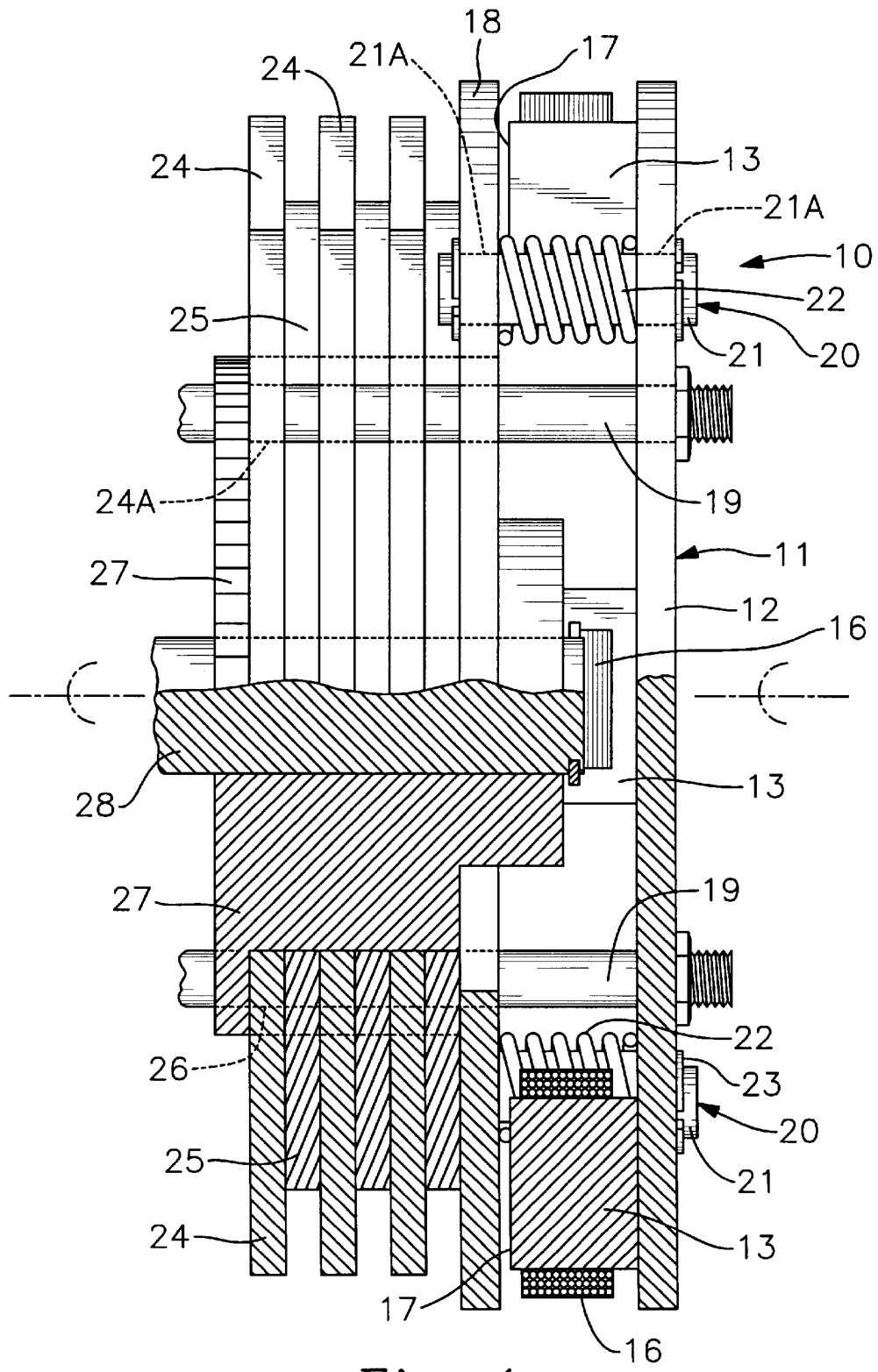
FIG. 1 is a side elevational view of the invention with parts broken away and in cross-section.
Figure 2:
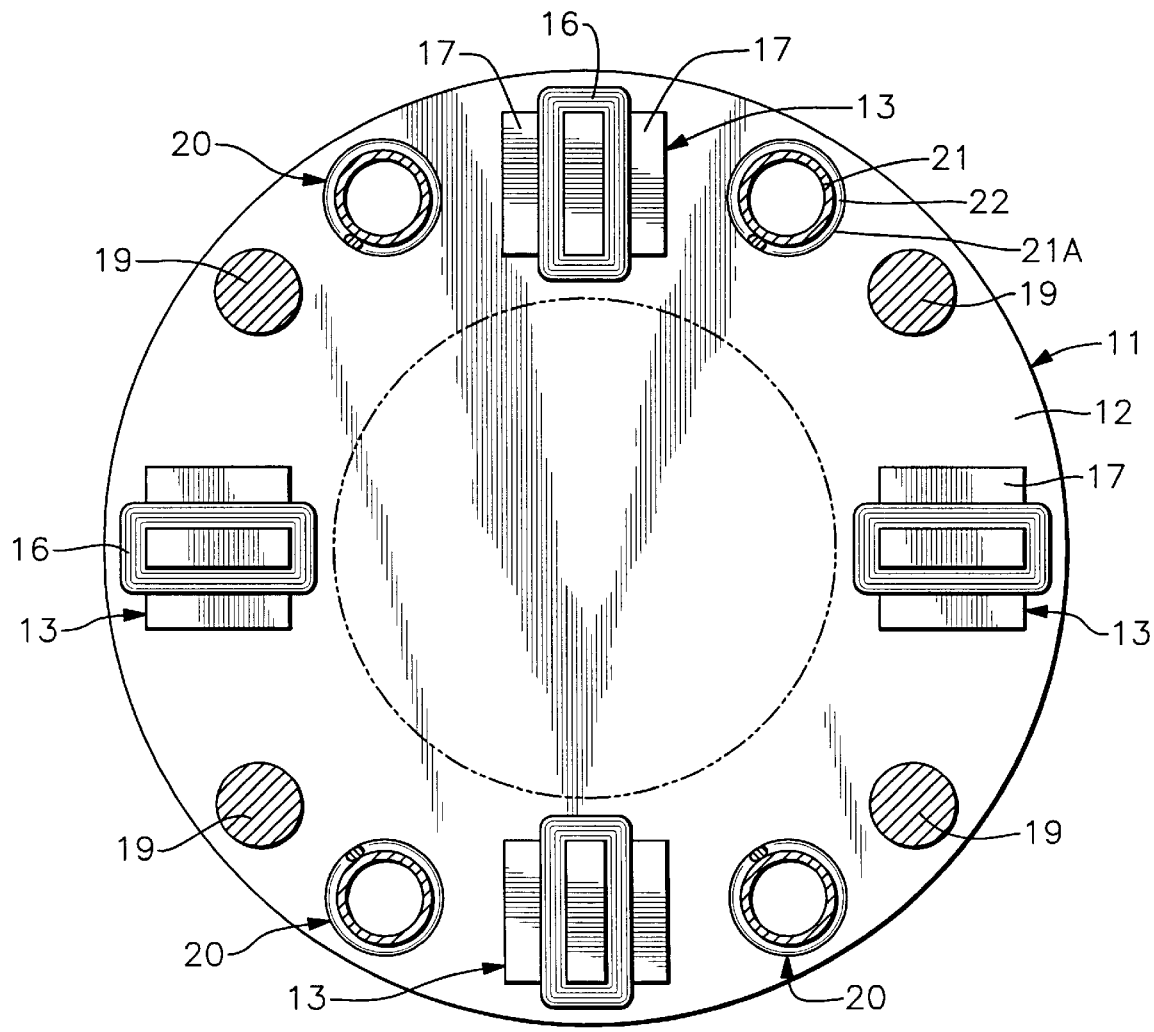
FIG. 2 is a side elevational view of the coil plate assembly.
Figure 3:
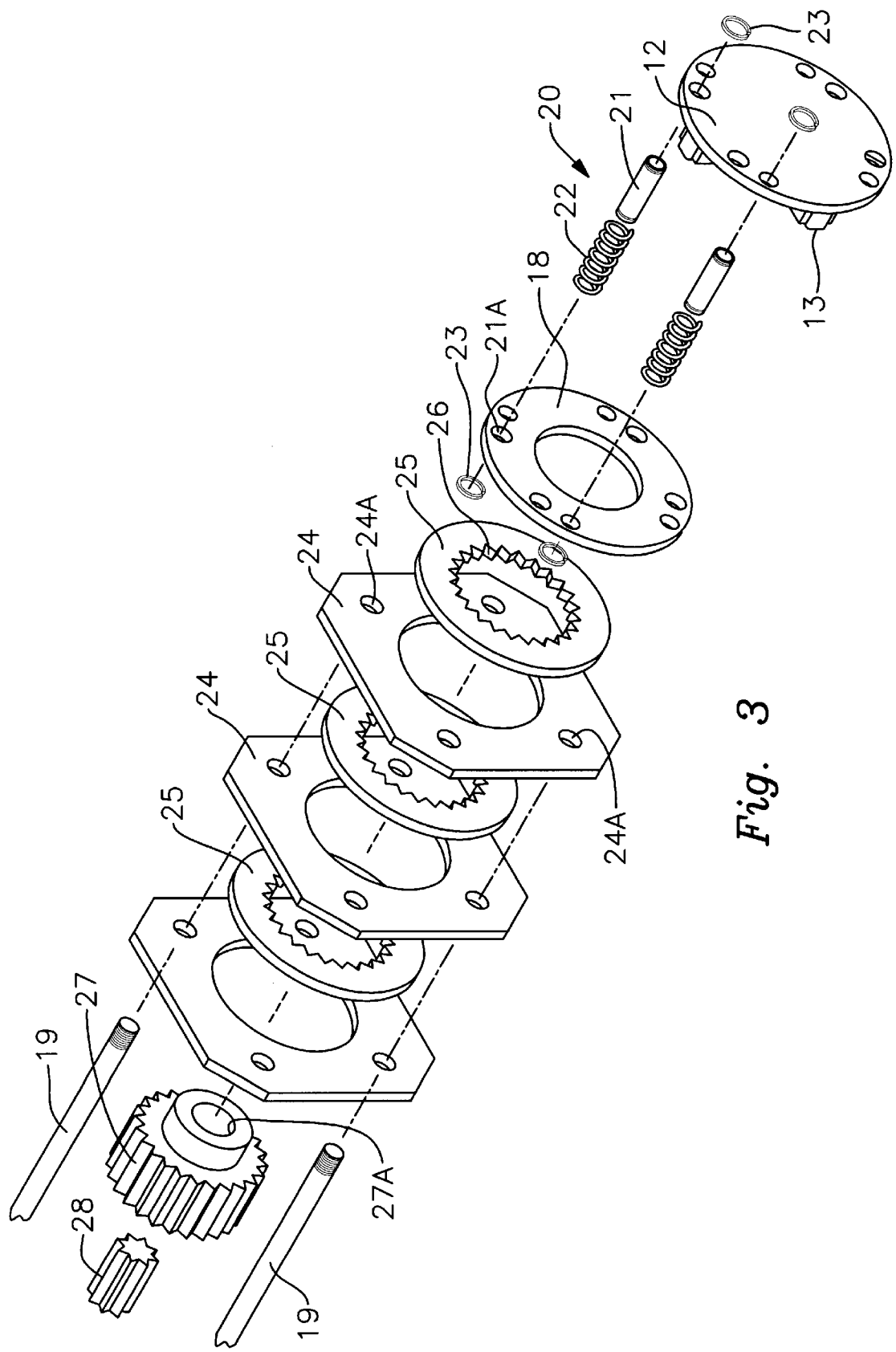
FIG. 3 is an exploded assembly view of the crane brake of the invention with parts broken away.

It will be evident from the above description that each of the thrust disks 24 also have a central aperture therein being large enough to allow for the free rotation of the geared brake hub 27 extending therethrough as assembled and illustrated in FIG. 1 of the drawings.

The thrust disks 24 are in variable degrees of frictional contact with the respective rotatable friction disks 25 driven by the gear brake hub 27 depending on the selective engagement of the spring-urged braking plate 19 thereagainst when the electromagnetic coils 13 are not engaged. The spring-urged braking plate 19 is thus in full contact with the first of the friction disks 25 adjacent thereto increasing frictional contact between the respective multiple thrust and friction disks 24 and 25, braking the crane, not shown.

Clearance between the coils 13, plate engagement surfaces 17 and the braking plate 19 is typically thirty thousandth of an inch. Therefore once the coils 13 are energized and the braking plate is retracted against the coils plate engagement surfaces 17 the first friction disk 25 adjacent the braking disk 19 and the interconnected braking hub 27 can rotate within the tolerance parameters as noted above and illustrated in exaggerated form in FIG. 5 of the drawings for illustration purposes only.

Referring now to FIG. 6 of the drawings, the electrical circuit C is illustrated in an electrical flow use diagram having a source of power at 30 (440V AC) in this example inputting to a transformer 31 which is tuned selectively and puts out a qualified 110V AC. A relay coil 32 powered by the 110V AC output has a set of switch contacts associated therewith. A rectifier 34 converts the 110V AC output of the transformer 31 to DC current supplying same through the switch contacts to a parallel supply circuit 35 having two sets 36 and 37 of the electromagnetic coils 13 interconnected in series in a pair of electrical circuits at 36A and 37A.

It will be evident from the above description that by use of the multiple coils 13 driven by low DC volt current each of the coils 13 have a quick activation and decay which is required in such environments.

As it will also have been understood, that the tension springs 22 of the spring tension assemblies 20 hereinbefore described provide a fail safe braking action in the event of power loss. Further, as the gap between the electromagnetic coils 13's coil brake engagement surface 17 and the braking plate 19 increases due to the wear between the friction disks 25 and the thrust plates 24 that once same has achieved a certain pre-determined distance such as sixty thousandth of an inch adjustment and/or replacement is then required to recalibrate the system to proper working parameters.

It will thus be seen that a new and useful and improved crane brake has been illustrated and described and it will be apparent to those skilled in the art that various changes and modifications may be made thereto without departing from the spirit of the invention.

Therefore I claim:

1. An industrial electromagnetic disk brake for cranes comprising; a coil plate and a brake plate, said coil plate is fixed in relation to said brake plate having a plurality of electromagnetic coils thereon, pairs of spring receiving sleeves extending between said coil plate and said brake plate said brake plate selectively engaging a friction disk of a friction and thrust disk assembly, said friction disk rotatably interconnected to an output drive shaft of said crane, circuits electrically interconnecting said electromagnetic coils in series from a parallel circuit, a source of power for said electromagnetic coils comprises; a tuned transformer, a coil relay interconnected thereto, a rectifier converting AC input from said tuned transformer to DC output, a switch means connected to said DC current and said parallel circuits.

2. The industrial electromagnetic disk brake of claim 1 wherein said friction and thrust disk assembly comprises; a plurality of apertured aligned thrust disks and a plurality of friction disks interspersed between one another, said thrust disk movable positioned on mounting rods extending therethrough secured to said coil plate.

3. The industrial electromagnetic disk brake set forth in claim 2 wherein said friction disks are registerably positioned on a drive gear interconnected to an output source of said crane.

4. The industrial electromagnetic disk brake set forth in claim 1 wherein said electrical circuit for electrically interconnecting said electromagnetic coils in paired series from a primary parallel circuit comprises; means for receiving and transforming power from a source, means for converting AC current to DC current from said transforming means, a relay coil in communication with said transforming means, a contact switch associated with said DC current for direct activation of said electromagnetic coils in pairs of independent coil circuits in series.

5. In industrial electromagnetic disk brake set forth in claim 4 wherein said DC current applied to said coils comprises; a pair of coil circuits in series, a plurality of said electromagnetic coils connected to each circuit, said coil circuits applied in parallel to said DC current from said switch contacts.

6. The industrial electromagnetic disk brake set forth in claim 4 wherein said means for receiving and transferring power from a source comprises; a tuned AC transformer.

7. The industrial electromagnetic disk brake set forth in claim 4 wherein said means for converting AC current into DC current from said transformer means comprises; a rectifier positioned within said circuit for receiving output of said transformer means.

8. The industrial electromagnetic disk brake set forth in claim 1 wherein said activation of said electromagnetic coils on said coil plate retracts said brake plate disengaging said first friction disks of said friction disk and thrust disk assembly releasing said brake.

9. The industrial electromagnetic disk brake set forth in claim 1 wherein said deactivation of said electromagnetic coils on said coil plate releases said brake plate which then selectively engages said first friction disk of said friction disk assembly engaging said brake.

* * * * *